United States Patent
Shafi

(10) Patent No.: US 8,839,205 B2
(45) Date of Patent: *Sep. 16, 2014

(54) ANALYSIS AND TIMELINE VISUALIZATION OF THREAD ACTIVITY

(71) Applicant: Microsoft Corporation, Redmond, WA (US)

(72) Inventor: Hazim Shafi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,517

(22) Filed: Nov. 11, 2013

(65) Prior Publication Data

US 2014/0068565 A1 Mar. 6, 2014

Related U.S. Application Data

(63) Continuation of application No. 12/606,960, filed on Oct. 27, 2009, now Pat. No. 8,601,444.

(51) Int. Cl.
*G06F 9/44* (2006.01)
*G06F 11/00* (2006.01)
*G06F 9/45* (2006.01)
*G06F 11/36* (2006.01)

(52) U.S. Cl.
CPC ........ *G06F 11/3664* (2013.01); *G06F 11/3636* (2013.01)
USPC ........... 717/128; 717/127; 717/132; 709/224; 702/119; 714/45; 703/22

(58) Field of Classification Search
None
See application file for complete search history.

(56) References Cited

U.S. PATENT DOCUMENTS

| | | | |
|---|---|---|---|
| 5,297,274 A | 3/1994 | Jackson | |
| 6,226,787 B1 | 5/2001 | Serra et al. | |
| 6,282,701 B1 | 8/2001 | Wygodny | |
| 6,470,383 B1 | 10/2002 | Leshem | |
| 6,611,276 B1 | 8/2003 | Muratori et al. | |
| 7,131,113 B2 | 10/2006 | Chang | |
| 7,478,368 B2 | 1/2009 | Hoover, Jr. et al. | |
| 7,496,857 B2 | 2/2009 | Stata et al. | |
| 7,519,959 B1 | 4/2009 | Dmitriev | |
| 7,698,686 B2 * | 4/2010 | Carroll et al. | 717/125 |
| 8,464,221 B2 * | 6/2013 | Zheng et al. | 717/124 |

(Continued)

OTHER PUBLICATIONS

Gabriela Jacques Da Silva, et al., JRastro: A Trace Agent for Debugging Multithreaded and Distributed Java Programs—Published Date: 2003 http://ieeexplore.ieee.org/stamp/stamp.jsp?tp=&arnumber=1250320&isnumber=27982.

(Continued)

*Primary Examiner* — Michael Sun
(74) *Attorney, Agent, or Firm* — Kevin Sullivan; Brian Haslam; Micky Minhas

(57) ABSTRACT

Analyzing the performance of multi-threaded applications. An analysis and visualization of thread executions is performed on a graphical timeline using samples of thread execution. This allows users to understand when their application threads are executing, what they were executing, the degree of concurrency in thread execution, and the order in which work is performed in their application. The visualizations and analysis also allow users to sample thread execution contexts using a graphical user interface, as well as the generation of execution profile reports that may be filtered for a specific time range of execution and a subset of the threads running in the application.

20 Claims, 8 Drawing Sheets

(56) References Cited

U.S. PATENT DOCUMENTS

2006/0075386 A1    4/2006  Loh et al.
2009/0319996 A1*  12/2009  Shafi et al. .................. 717/125
2010/0318852 A1*  12/2010  Zheng et al. .................. 714/37
2011/0202866 A1    8/2011  Huang et al.

OTHER PUBLICATIONS

Thread Scheduling Visualizer 2.0—Published Date: Aug. 21, 2009 http://java.sun.com/javase/technologies/realtime/reference/TSV/JavaRTS-TSV.html#threadinfo.

Rick Strong et al., Initial Experiments in Visualizing Fine-Grained Execution of Parallel Software through Cycle-Level Simulation—Published Date: 2009 http://www.hpl.hp.com/techreports/2008/HPL-2008-210.pdf.

Office Action cited in U.S. Appl. No. 12/606,960 dated Dec. 17, 2012.

Office Action cited in U.S. Appl. No. 12/606,960 dated Apr. 23, 2013.

Notice of Allowance cited in U.S. Appl. No. 12/606,960 dated Aug. 2, 2013.

* cited by examiner

| Profile Report | Current Stack | Unblocking Stack | Hints ? | | | |
|---|---|---|---|---|---|---|
| Execution Profile | Noise Reduction at | % | | | | |

700

| Name | Inclusive Samp... | Exclusive Samp... | % Inclusive | % Exclusive | Details |
|---|---|---|---|---|---|
| matmult2.exe | 179 | | | | |
| _tmainCRTStartup+010f | 146 | 0 | 63.48% | 0.00% | MatMult2!_tmainCRTStartup+0x10f:crtexe. |
| wmain+0x117 | 146 | 4 | 63.48% | 1.74% | MatMult2!wmain+0x117:matmult2.cpp:80 |
| WriteFileImplementation@20+0x76 | 84 | 1 | 36.52% | 0.43% | kernel32!_WriteFileImplementation@20+0x76 |
| WriteFile@20+0x113 | 83 | 0 | 36.09% | 0.00% | KernelBase!_WriteFile@20+0x113 |
| _NtWriteFile@36+0xc | 83 | 1 | 36.09% | 0.43% | ntdll!_NtWriteFile@36+0xc |
| _KiTrap0E+0xdc | 24 | 3 | 10.43% | 1.30% | ntkmlpa!kiTrap0E+0xdc |
| MatMult+0x5b | 23 | 20 | 10.00% | 8.70% | MatMult2!MatMult+0x5b:matmult2.cpp:38 |
| @kiXMMiZeroPagesNoSave@8+0x9 | 9 | 9 | 3.91% | 3.91% | ntknlpa!@kiXMMIZeroPagesNoSave@8+0x9 |
| MatMult+0xc5 | 33 | 24 | 14.35% | 10.43% | MatMult2!MatMult+0xc5matmult2.cpp:38 |
| _RtlEnterCriticalSection@4+0x150 | 5 | 0 | 2.17% | 0.00% | ntdll!RtlEnterCriticalSection@4+0x150 |
| _RtlpWaitOnCriticalSection@8+0x13e | 5 | 0 | 2.17% | 0.00% | ntdll!_RtlpWaitOnCriticalSection@8+013e |
| _ZwWaitForSingleObject@12+0xc | 5 | 0 | 2.17% | 0.00% | ntdll!_ZwWaitForSingleObject@12+0xc |
| KiFastCallEntry+0x12a | 5 | 0 | 2.17% | 0.00% | ntkmlpa!_KiFastCallEntry+0x12a |
| NtWaitForSingleObject@12+0xc6 | 5 | 1 | 2.17% | 0.00% | ntkmlpa!_NtWaitForSingleObject@12+0xc6 |
| Ntkmlpa.exe | 18 | | | | |
| ataport.sys | 16 | | | | |
| halmacpi.dll | 7 | | | | |

*Figure 7*

ANALYSIS AND TIMELINE VISUALIZATION OF THREAD ACTIVITY

CROSS-REFERENCE TO RELATED APPLICATIONS

This application is a continuation of U.S. patent application Ser. No. 12/606,960, filed Oct. 27, 2009, and entitled "ANALYSIS AND TIMELINE VISUALIZATION OF THREAD ACTIVITY." The entire contents of the foregoing application is incorporated by reference herein in its entirety.

BACKGROUND

Computing systems are providing ever more complex and sophisticated functionality. Such functionality is often primarily driven by underlying software, which itself is becoming ever more complex. Application developers have the task of developing such software, and to tune performance to ensure efficient operation. Such application developers and other entities might also be interested in evaluating software performance.

Application developers have a wide variety of tools at their disposal in order to author software. First, source code allows the application developer to author software using instructions that are more understandable and intuitive to a human than is binary or intermediate code. The source code is ultimately compiled and/or interpreted into binary to allow readability of the code by a computing processor. In addition, various authoring tools allow for various visualizations that allow a developer to have a good understanding of how the application is currently functioning. For instance, some authoring tools allow a programmer to step through the execution of a program, one line of source code at a time, and evaluate the values associated to various parameters and variables. Authors might also insert temporary lines of code with the design for use in debugging. Other profiling tools give a sense for what percentage of the time the program takes performing particular operations.

BRIEF SUMMARY

Embodiments described herein relate to the formulation of multiple thread timelines, one for each of at least some of the threads that contribute to the execution of an application program. Periodically, information regarding each operating thread is gathered, such as the current callstack for the thread. After execution of the application program is completed, a thread timeline may be formulated for each thread, where a visualization is provided to represent whether the thread is executing or not at any given time. In one embodiment, the timelines may be disabled so as to not render one or more thread timelines of lesser interest, and the timelines may be zoomed in on to focus on specific times of interest.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 7 illustrates a user interface that shows another kind of profile report, and illustrates a proportion of time that execution for a particular thread is in a particular portion of the program for a particular selected timeframe.

DETAILED DESCRIPTION

In accordance with embodiments described herein, thread timeline(s) are constructed based on underlying event data recorded when threads operate during execution of the application program. First, some introductory discussion regarding computing systems will be described with respect to FIG. 1. Then, various embodiments of the rendering of thread timelines will be described with reference to FIGS. 2 through 8.

Figure 1:
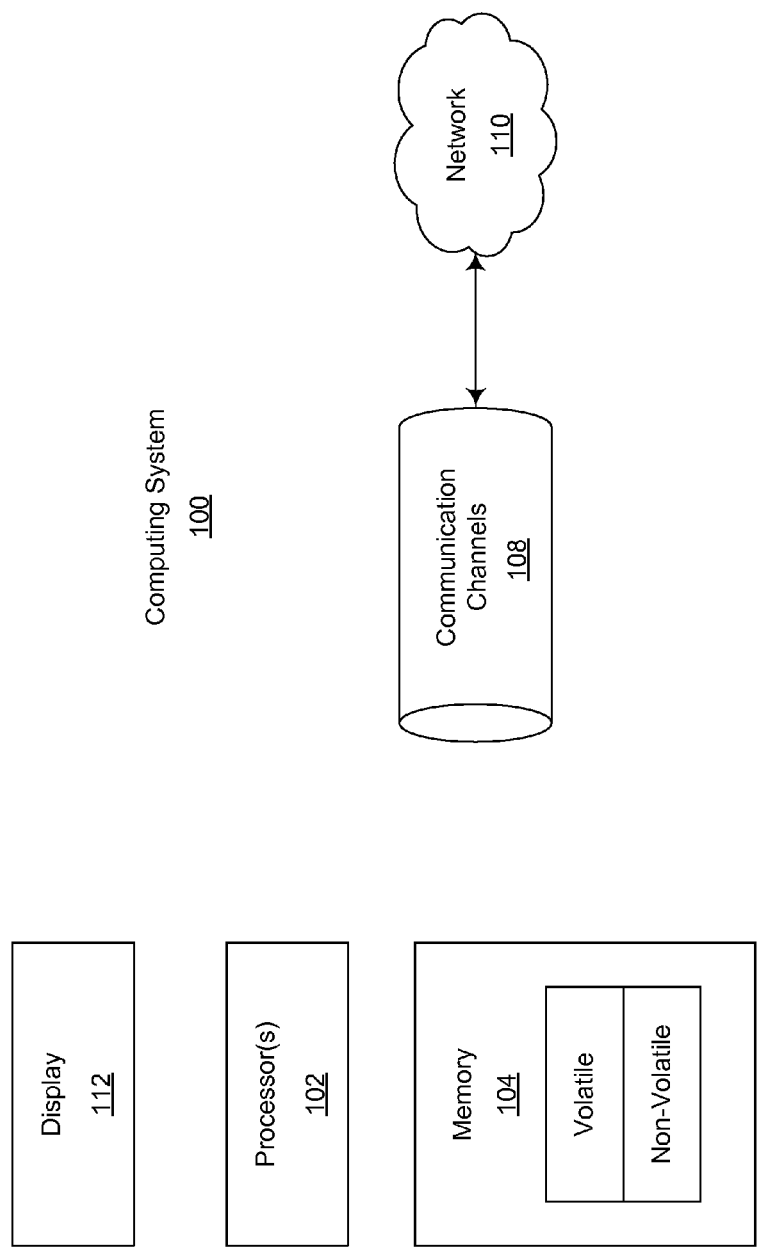
FIG. 1 illustrates an example computing system that may be used to employ embodiments described herein.

First, introductory discussion regarding computing systems is described with respect to FIG. 1. FIG. 1 illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Optionally, the computing system may include a display 112 for displaying visualizations. For instance, if the computing system performs the method 200 of FIG. 2, the visualization of the thread timeline of the execution of the target program may be rendered at the computing system 100. Having described a computing system that may be used to implement features of the principles described herein with respect to FIG. 1, a specific example of thread timeline formulation will be described with respect to FIG. 2 through 8

Figure 2:
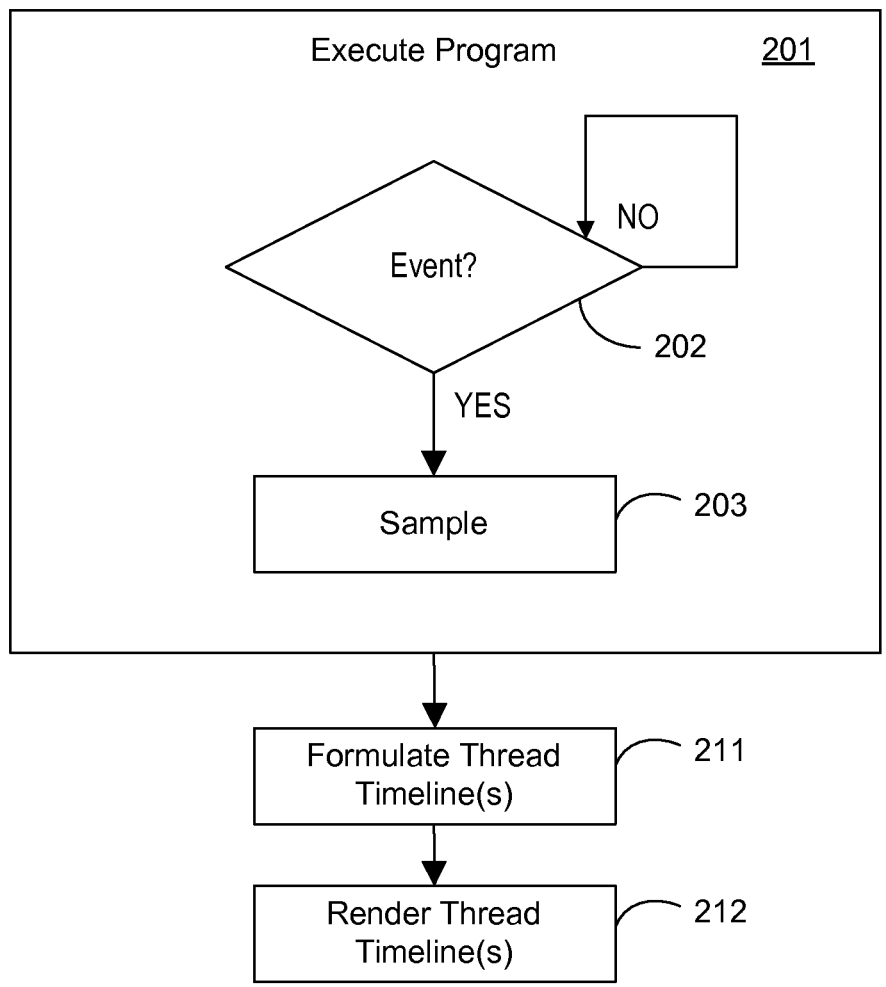
FIG. 2 illustrates a flowchart of a method for a computing system to display a visualization of multiple thread timelines.

FIG. 2 illustrates a flowchart of a method 200 for a computing system to display a visualization of multiple thread timelines. The method 200 involves the execution of the application program (act 201) that is being evaluated and for which thread timelines will be formulated and visualized. The application program includes computer-executable instructions that may be present in the memory 104 of the computing system, and which may be executed by the processing unit 102 (which may even include multiple processors), to thereby direct functionality of the computing system 100.

The principles described herein are not specific in any way to the functionality of the application program itself and may be applied to any application program, whether existing or yet to be developed. Regardless, the functionality of the application program is enabled by multiple threads that are created and terminated at various times to support the functionality of the application program. Often, a main thread is created to support the operation of the operating system itself while several other worker threads are created to support the operating system and application program.

Even after a thread is created, the thread need not be actually executing instructions at any given time. A thread may pause for any one of a variety of reasons. Accordingly, each thread does not necessarily execute instructions during the entire course of the execution. In this description and in the claims, a thread that is actively executing instructions will be referred to as "executing".

While executing the application program, each operating thread is sampled (act 203) in response to particular events (Yes in decision block 202). Such events might be the creation of the thread. Such events might also be the prospective termination of the thread. The event might be a periodic time event that causes each then-operating thread to be sampled at periodic intervals. The detection of such events, and the generation of sample data at the event for each thread may be accomplished using the Event Tracing for Windows (ETW) if using the MICROSOFT® WINDOWS® operating system. However, the principles described herein are not limited to a WINDOWS operating system, as other operating systems may now have, or may be developed to include eventing frameworks capable of sampling threads.

The sampled data might include 1) the identity of the thread sampled, 2) the time of sampling, and 3) the callstack for the thread at the time of sampling. Thus, after execution is completed, there will be a collection of sample data that may be evaluated to formulate a thread timeline (act 211). The thread timelines are then rendered (act 212), by compiling the sampled data for each thread, and properly ordering the sampled data by sample time.

Figure 3:
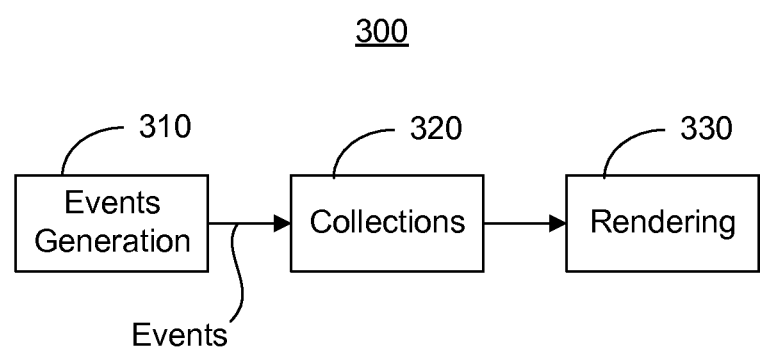
FIG. 3 illustrates an architecture that may be used to accomplish the method of FIG. 2.

FIG. 3 illustrates an architecture 300 that may be used to accomplish the method. Here, an events generation module 310 is configured to sample a status of multiple threads that are operating to execute an application program. As previously mentioned, the sampled status includes whether the thread is executing or not. A collections module 320 collects sampled data to formulate an in-memory representation of a plurality of thread timelines using the sampled data for the plurality of threads. A rendering module 330 selectively renders the thread timelines. The rendering module 330 may turn on or turn off thread timelines such that they are visible or not visible, respectively, so that as to display the threads that are more germane to the analysis of the application program. Similarly, the rendering module 330 may permit the user to view only a portion of the overall execution time to allow for more details to be viewed regarding a time of interest.

The thread timeline may include visualization for whether or not a thread is executing or not. For instance, perhaps a color (maybe green) and/or texture is assigned to timeframes in which the corresponding thread is executing. Although not required, in some embodiments, a visualization (e.g., another color) may also be provided to illustrate that a thread is not executing. In one embodiment, an analysis is made to determine why a thread is not executing, if in fact the thread is not executing at a particular timeframe. In that case, different visualizations (e.g., colors and/or textures) may be used to represent the reason why the thread is not executing. For instance, there might be visualizations to show that a non-executing thread is not executing due to synchronization, not executing because the thread is waiting for disk I/O, not executing because the thread is sleeping, not executing due to paging operations, not executing because the thread has been preempted, not executing because the thread is waiting for user interface I/O, and so forth. However, regardless of any such extra information, the timeline shows when a thread is executing.

This permits an evaluator to see various thread timelines in a common timeframe to see the various interrelations between thread operations. FIGS. 4 through 8 will be illustrated to show various aspects of a user interface that may be used to present timeline visualizations for threads.

Figure 4:
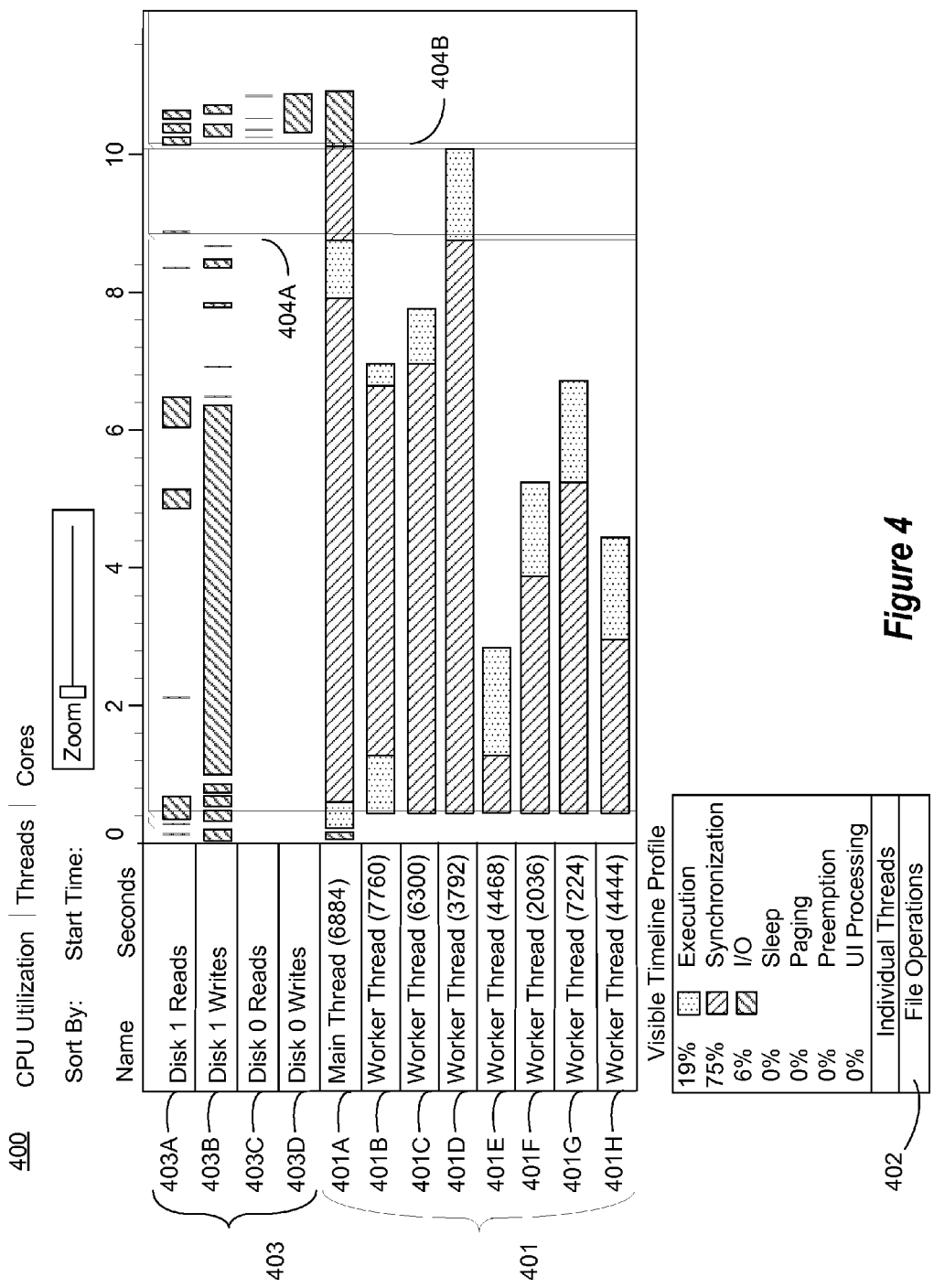
FIG. 4 illustrates a user interface in which there are various thread timelines rendered, along with disk access timelines.

FIG. 4 illustrates a user interface 400 in which there are various thread timelines 401 illustrated as main thread timeline 401A and worker thread timelines 401B through 401H. Each thread timeline was formulated according to the method described herein based on periodic sampled data for each thread. Though colors are not represented here, the use of a color may be employed to represent the status of each thread at particular times. Because color drawings are discouraged in patent applications, dot-filled rectangles are used herein to represent areas that might that are green (but such areas will still be referred to as "green" herein), left-leaning diagonally cross-hatched rectangles are used to represent areas that are red (but such areas will still be referred to herein as "red"), and right-leaning diagonally cross-hatched rectangles are used to represent areas that are pink (but such areas will still be referred to as pink herein). As represented by the operations legend 402, the green areas represent times that the thread is executing, the red represents times that the thread is not executing due to synchronization, and pink represents times that the thread is not executing due to disk I/O. There may be other reasons for non-execution of threads such as sleep, paging, preemption and UI processing, each being represented by a distinct visualization. However, since none of the threads in the example illustrate such behavior to any significant extent, they are not assigned any particular filling pattern in the examples of FIGS. 4 through 8.

As illustrated in FIG. 4, the application being profiled appears to be a multi-threaded application as at any given time, there may be multiple threads executing. For instance, at time=4 seconds, there are five threads executing including the main thread, and worker threads 7760, 6300, 3792, and 7224. Thus, an evaluator can get a good visual and intuitive idea of what the application program is doing down to the level of visualizing what the threads themselves are doing.

Note that there are also disk I/O timelines 403 includes four disk I/O timelines 403A, 403B, 403C, and 403D. Such timelines may also have been constructed from underlying event data that is generated when a file write is initiated and terminated, and when a file read is initiated and terminated. If data regarding the file identity is also gathered, the user might, for example, select a particular colored rectangle that represents that a file I/O is occurring (e.g., a pink rectangle) to have some popup or other visualization of the file identity. Here, there are two disks, and four disk I/O channels, one read channel for each disk, and one write channel for each disk. Thus, an evaluator may visualize also how the threads interact with the various disk I/O channels as well as how the threads interact with each other.

There are scoping controls 404A and 404B that may be used to narrow in on a particular range of the timeline. The scoping controls may be slid left and right to change the start and end times of a timeframe of particular interest.

Figure 5:
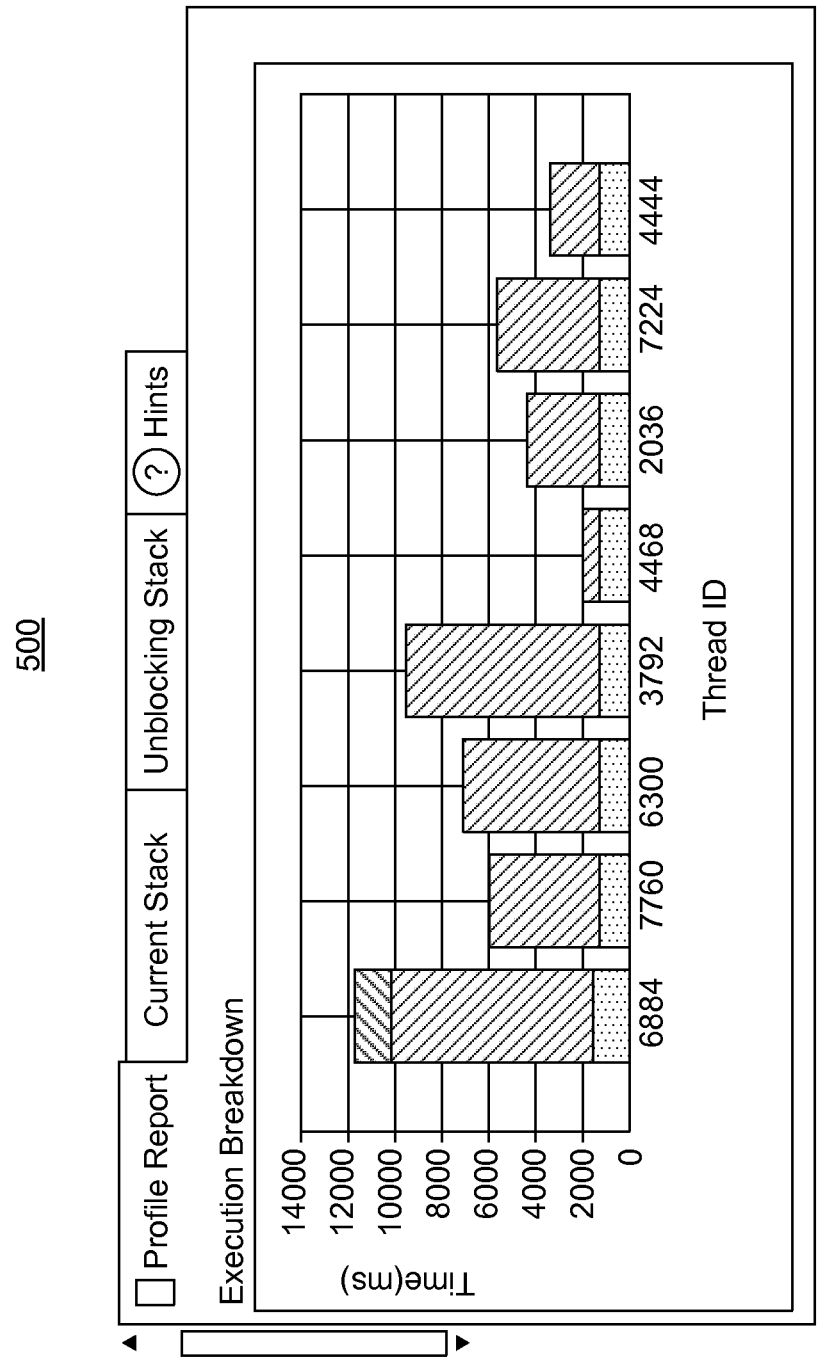
FIG. 5 illustrates a user interface that may appear perhaps also in conjunction with the user interface of FIG. 4.

FIG. 5 illustrates a user interface 500 that may appear perhaps also in conjunction with the user interface 400 of FIG. 4. Here, information regarding the entire thread timeline is illustrated as an execution profile report. Although this execution profile report is illustrated as representing the entire thread timeline, the scoping controls 404A and 404B of FIG. 4 may be used to narrow in on a particular timeframe of interest, causing corresponding changes in the execution profile report. Here, for each thread that is operating in the relevant timeframe (here, all threads since the timeframe is the entire execution timeline), the execution profile report provides a representation of a proportion of the time within the selected time range that each corresponding thread is executing, and respective proportions of times that the thread is not executing for various reasons.

Figure 6:
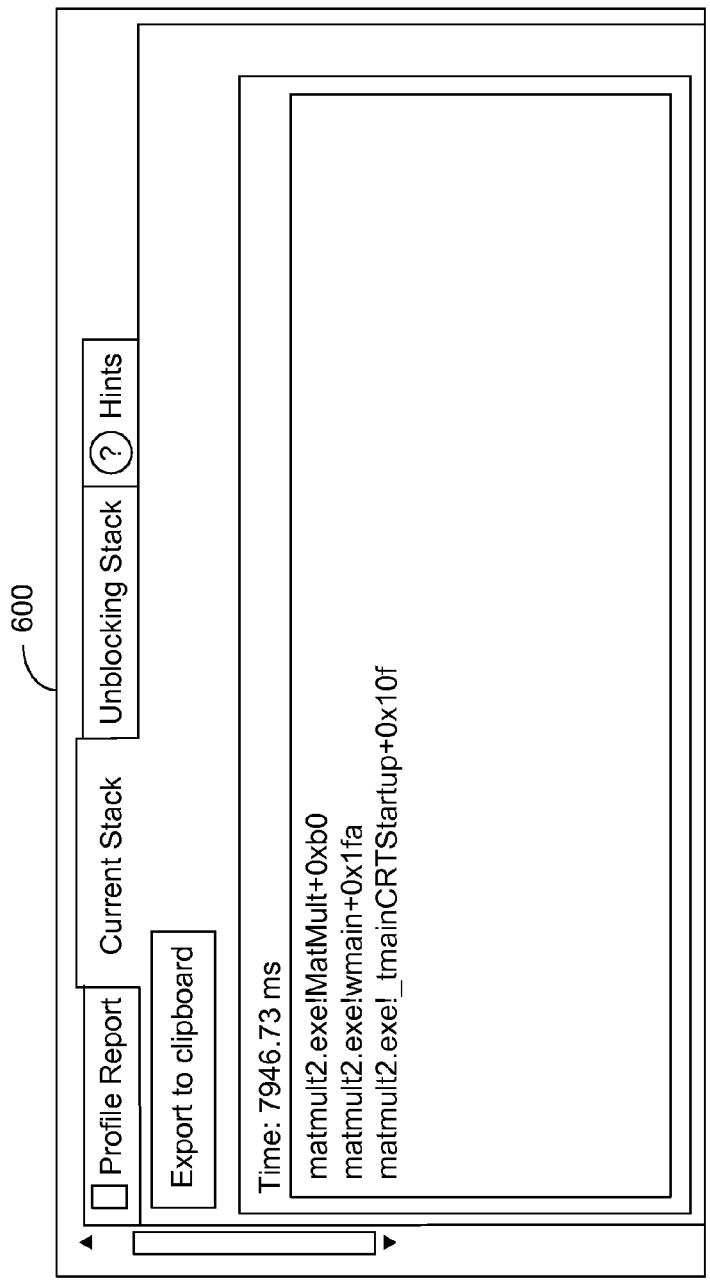
FIG. 6 illustrates a user interface that appears in which a particular time is selected from the user interface of FIG. 4.

FIG. 6 illustrates a user interface 600 that appears in which a particular time is selected from the user interface 400 of FIG. 4. Here, time=7946.73 milliseconds has been selected on a particular thread timeline. Recall that the callstack of a thread may be one item of data that is gathered periodically while a thread is in existence. When a particular time of a particular thread is selected, the system may go to the closest sampling time for that selected thread, and retrieve the callstack itself from the appropriate sample. That will give the evaluator a sense of where the thread was in execution at a particular selected point in time, and gives the evaluator a further tool for understanding the operation of the program.

FIG. 7 illustrates a user interface 700 that shows another kind of profile report, and illustrates a proportion of time that execution for a particular thread is in a particular portion of the program for a particular selected timeframe. This information may be formulated by analyzing the callstacks gathered for the thread over the selected timeframe.

Figure 8:
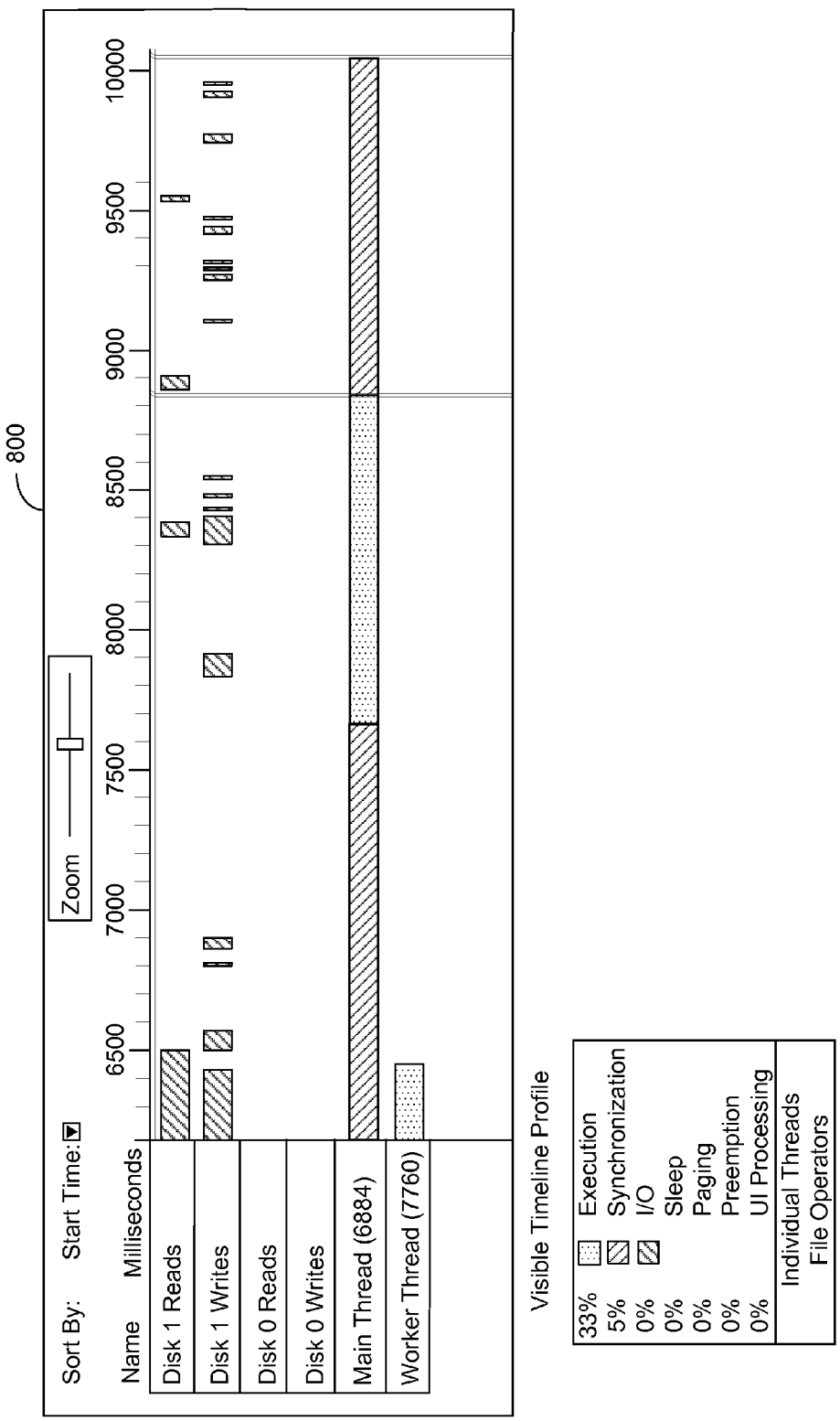
FIG. 8 illustrates a user interface that is similar to the user interface of FIG. 4, except with some worker thread timelines deselected so as to no longer be visible.

FIG. 8 illustrates a user interface 800 that is similar to the user interface 400 of FIG. 4, with one notable difference. Specifically, all of the worker threads except for one have been deselected, or turned off, such that they are no longer visible. Instead, only one worker thread timeline is illustrated corresponding to worker thread 7760. This allows the evaluator to narrow in and focus evaluation of a particular thread of interest. Thus, the principles provided herein permit thread timeline visualizations to be turned on and off, and also allows particular timeframes of interest to be narrowed in to show more detail. This is even further functionality that, when combined with the thread timelines visualizations and disk I/O timeline visualizations, provides the evaluator with a comprehensive and powerful tool to evaluate the operation of application programs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a computing system to display a visualization of thread timelines and disk input/output channel timelines, the method comprising:
    an act of executing an application program, wherein the execution of the application program results in operation of a plurality of threads and one or more disk input/output channels that are used by the plurality of threads;

during the act of executing the application program, an act of sampling each operating thread of the plurality of threads to determine whether the operating thread is executing or not; and after the act of executing the application program, formulating a visualization for a plurality of thread timelines and one or more disk input/output channel timelines using the samples, and said visualization being characterized by the following:

each of the plurality of thread timelines corresponding to one of the plurality of threads, each of the one or more disk input/output channel timelines corresponding to one of the disk input/output channels, each disk input/output channel timeline visualizing file input/output as it relates to at least one of the plurality of thread timelines, and at least one of the plurality of thread timelines visualizing at least one time segment during which the corresponding thread was executing at corresponding times along the corresponding thread timeline.

2. The method in accordance with claim 1, wherein the act of sampling also samples a call stack in which the corresponding thread operates at each sample time and for each of the threads operating at the corresponding sample time.

3. The method in accordance with claim 1, further comprising presenting a user interface wherein a user may select an executing portion of the corresponding thread timeline, causing at least a portion of sampled data of the corresponding thread to be displayed.

4. The method in accordance with claim 3, wherein the sampled data corresponds to a sampling time that is a closest sample to the selected executing portion of the corresponding thread timeline.

5. The method in accordance with claim 4, wherein the sampled data includes a call stack of the sampling time.

6. The method in accordance with claim 1, wherein at least one of the plurality of threads has a user interface wherein a user may select a time range, wherein the sampled data corresponding to the selected time range is compiled to provide an execution profile report.

7. The method in accordance with claim 6, wherein the execution profile report provides approximate times that execution of the application program is at particular components of the application program.

8. The method in accordance with claim 6, wherein the execution profile report provides, for each of the plurality of threads that are operating within the selected time range, a representation of a proportion of the time within the selected time range that each corresponding thread is executing.

9. The method in accordance with claim 1, wherein the plurality of thread timelines share a common time reference, and may be zoomed in on to see more details regarding a selected subset of each of the plurality of timelines.

10. The method in accordance with claim 1, wherein at least one of the plurality of thread timelines visualizes a plurality of time segments during which the corresponding thread was blocked at corresponding times along the corresponding thread timeline.

11. A computing system, comprising:
one or more processors; and
one or more computer-readable hardware storage devices having stored thereon computer-executable instructions that are structured such that, when executed by the one or more processors during execution of a target program, the computing system implements the following:

an events generation module configured to periodically sample a status of multiple threads and disk input/output channels operating to execute an application program, the sampled status including at least whether each thread is executing;

a collections module that collects sampled data to formulate an in-memory representation of a plurality of thread timelines and one or more disk input/output channel timelines using the sampled data for the plurality of threads, each thread timeline corresponding to one of the multiple threads; and a rendering module configured to render the plurality of thread timelines and one or more disk input/output channel timelines, and said rendering by characterized by the following:

each disk input/output channel timeline visualizing file input/output as it relates to at least one of the plurality of thread timelines, each of the one or more disk input/output channel timelines corresponding to one of the disk input/output channels, each disk input/output channel timeline visualizing file input/output as it relates to at least one of the plurality of thread timelines, and at least one of the plurality of thread timelines visualizing at least one time segment during which the corresponding thread was executing at corresponding times along the corresponding thread timeline.

12. The computing system in accordance with claim 11, wherein the rendering module is configurable to disable one or more of the plurality of thread timelines and the at least one disk input/output channel timelines so as not to be rendered by the rendering module.

13. The computing system in accordance with claim 11, wherein the events generation module samples a call stack in which the corresponding thread operates at each sample time and for each of the threads operating at the corresponding sample time.

14. The computing system in accordance with claim 13, wherein at least one of the plurality of thread timelines has a user interface wherein a user may select an executing portion of the corresponding thread timeline, causing at least a portion of sampled data of the corresponding thread to be displayed.

15. The computing system in accordance with claim 14, wherein the sampled data includes a call stack of the sampling time.

16. The computing system in accordance with claim 11, wherein at least one of the plurality of threads has a user interface wherein a user may select a time range, wherein the sampled data corresponding to the selected time range is compiled to provide an execution profile report.

17. One or more computer-readable hardware storage devices having stored thereon computer-executable instructions that are structured such that, when executed by one or more processors of a computing system during execution of a target program, the computing system implements the following:

an events generation module configured to periodically sample a status of multiple threads and disk input/output channels operating to execute an application program, the sampled status including at least whether each thread is executing or not;

a collections module that collects sampled data to formulate an in-memory representation of a plurality of thread timelines and one or more disk input/output channel timelines using the sampled data for the plurality of threads, each thread timeline corresponding to one of the multiple threads; and a rendering module configured to render the plurality of thread timelines and one or more disk input/output channel timelines, and said rendering by characterized by the following:

each disk input/output channel timeline visualizing file input/output as it relates to at least one of the plurality of thread timelines, each of the one or more disk input/output channel timelines corresponding to one of the disk input/output channels, each disk input/output channel timeline visualizing file input/output as it relates to at least one of the plurality of thread timelines, and at least one of the plurality of thread timelines visualizing at least one time segment during which the corresponding thread was executing at corresponding times along the corresponding thread timeline.

18. The one or more computer-readable hardware storage devices in accordance with claim 17, wherein the events generation module samples a call stack in which the corresponding thread operates at each sample time and for each of the threads operating at the corresponding sample time.

19. The one or more computer-readable hardware storage devices in accordance with claim 18, wherein at least one of the plurality of thread timelines has a user interface wherein a user may select an executing portion of the corresponding thread timeline, causing at least a portion of sampled data of the corresponding thread to be displayed.

20. The one or more computer-readable hardware storage devices in accordance with claim 19, wherein the sampled data includes a call stack of the sampling time.

* * * * *